(12) United States Patent
Kenney et al.

(10) Patent No.: US 11,432,248 B1
(45) Date of Patent: Aug. 30, 2022

(54) CONSCIENTIOUS POWER AND RATE ADAPTATION IN A CDMA MANET

(71) Applicant: L3Harris Technologies, Inc., Melbourne, FL (US)

(72) Inventors: Brent A. Kenney, Bountiful, UT (US); James E. Hawker, Herriman, UT (US); Brian J. Thorp, Sandy, UT (US); Matthew J. Reimann, Draper, UT (US); Patrick L. Newbold, Draper, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 0 days.

(21) Appl. No.: 17/323,347

(22) Filed: May 18, 2021

(51) Int. Cl.
*H04W 52/24* (2009.01)
*H04W 52/36* (2009.01)
*H04W 84/18* (2009.01)

(52) U.S. Cl.
CPC ......... *H04W 52/243* (2013.01); *H04W 52/36* (2013.01); *H04W 84/18* (2013.01)

(58) Field of Classification Search
CPC .................... H04W 52/00–60; H04W 84/18
See application file for complete search history.

(56) References Cited

U.S. PATENT DOCUMENTS

| | | | | |
|---|---|---|---|---|
| 7,031,293 B1* | 4/2006 | Srikrishna | ............... | H04K 3/226 370/348 |
| 8,825,103 B2* | 9/2014 | Yamamoto | .......... | H04W 52/343 455/67.11 |
| 8,966,046 B2* | 2/2015 | Preden | .................... | H04L 41/02 370/254 |
| 9,295,099 B2* | 3/2016 | Twitchell, Jr. | ........ | H04W 84/18 |
| 9,402,254 B2* | 7/2016 | Kneckt | ................. | H04W 48/08 |
| 10,181,972 B1 | 1/2019 | Giallorenzi et al. | | |
| 2015/0117305 A1* | 4/2015 | Palankar | ............... | H04W 40/24 370/328 |
| 2015/0172953 A1* | 6/2015 | Firoiu | ................. | H04L 41/0816 370/236 |
| 2017/0093687 A1* | 3/2017 | Wu | ..................... | H04W 40/246 |

* cited by examiner

*Primary Examiner* — Raymond S Dean
(74) *Attorney, Agent, or Firm* — Workman Nydegger

(57) ABSTRACT

Determining maximum transmit power by a local node. A method includes identifying one-hop neighbor nodes of the local node in the mesh network. One or more threshold maximum changes in interference caused by the local node increasing its transmit power for each of the one-hop neighbor nodes of the local node are identified. A plurality of power change values are identified. Each power change value in the plurality of power change values corresponds to a power change at the local node that would cause one of the threshold maximum changes in interference to occur at a corresponding one-hop neighbor node of the local node. A lowest power change value from among the plurality of power change values is identified. As a result, power transmitted by the local node is increased, while limiting an increase in power transmitted by the local node to no more than the lowest power change value.

20 Claims, 3 Drawing Sheets

300

302 Identify one-hop neighbor nodes of the local node in the mesh network

304 Identify one or more threshold maximum changes in interference caused by the local node increasing its transmit power for each of the one-hop neighbor nodes of the local node

306 Identify a plurality of power change values, each power change value in the plurality of power change values corresponding to a power change at the local node that would cause one of the threshold maximum changes in interference to occur at a corresponding one-hop neighbor node of the local node

308 Identify a lowest power change value from among the plurality of power change values

310 As a result, increase power transmitted by the local node, while limiting an increase in power transmitted by the local node to no more than the lowest power change value

*FIG. 3*

CONSCIENTIOUS POWER AND RATE ADAPTATION IN A CDMA MANET

BACKGROUND

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Some computing systems communicate using ad-hoc mesh networks, which are typically wireless decentralized networks where the various nodes in the mesh network identify neighbor nodes to add to the network. One example of such a network is a code division multiple access (CDMA) mobile ad-hoc network (MANET).

Nodes in mesh networks may need to increase power transmission for several different reasons. In a CDMA MANET it is advantageous to adapt the data rate based on the amount of data that is queued for transmission, to minimize the transmit power and the associated interference to other users in the network. If there is a sudden increase in the amount of queued data, then the affected node will try to increase its data rate, necessitating a commensurate increase in power. Power increases also occur in a CDMA MANET when a node attempts to make a connection with a node that is outside of its current connection range. Given the dynamic nature of the MANET, these power changes are common occurrences. However, if a node increases its power too drastically, it will create interference for other nodes in the mesh network causing those other nodes to lose their links. Thus, it is desirable to implement a system whereby nodes can increase transmit power without unduly affecting other nodes in mesh network.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in an ad-hoc mesh network. The method includes acts for increasing power transmitted by a local node. The method includes identifying one-hop neighbor nodes of the local node in the mesh network. The method further includes identifying one or more threshold maximum changes in interference caused by the local node increasing its transmit power for each of the one-hop neighbor nodes of the local node. The method further includes identifying a plurality of power change values. Each power change value in the plurality of power change values corresponds to a power change at the local node that would cause one of the threshold maximum changes in interference to occur at a corresponding one-hop neighbor node of the local node. The method further includes identifying a lowest power change value from among the plurality of power change values. As a result, the method includes increasing power transmitted by the local node, while limiting an increase in power transmitted by the local node to no more than the lowest power change value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 3 illustrates a method of increasing power transmitted by a local node.

DETAILED DESCRIPTION

Figure 1:
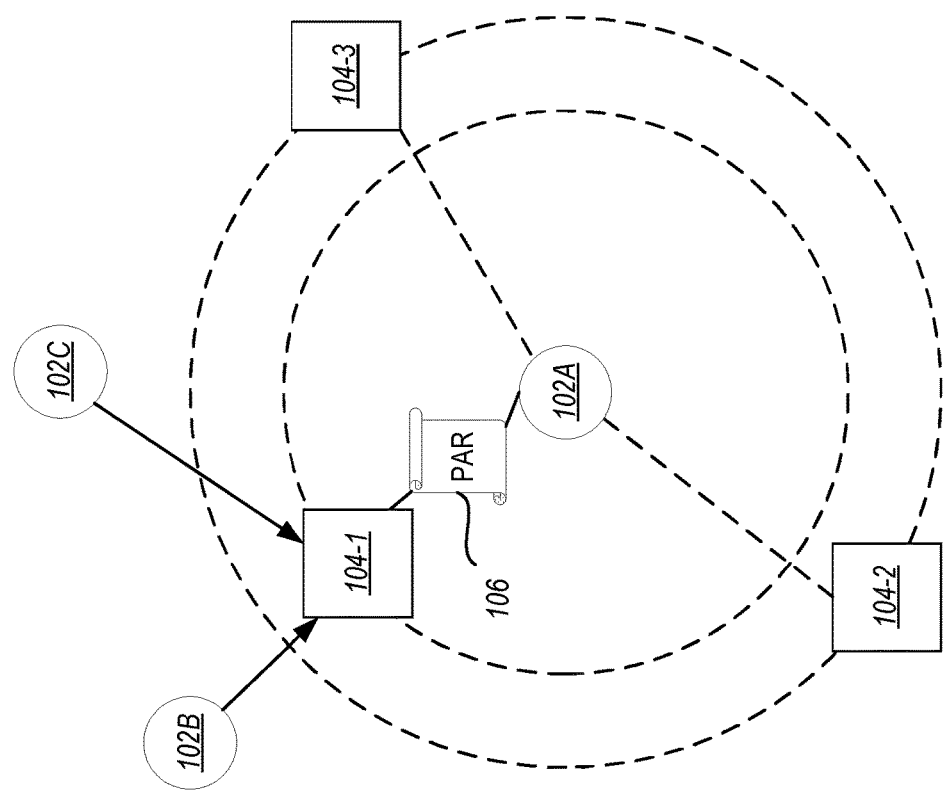
FIG. 1 illustrates an ad-hoc mesh network.

Embodiments illustrated herein are used to manage CDMA interference in a conscientious fashion that takes into account actions that may cause interference to other nodes in a mesh network. These embodiments can be particularly useful in dense mesh networks where nodes have many neighbors which may cause interference with each other. Embodiments can be applied whenever power changes by a local node can cause other nodes to drop their links or to manage additional interference due to a sudden change in interference caused by the local node.

Some embodiments may be implemented using a multi-channel direct sequence spread spectrum waveform, code division multiple access (CDMA) implementation, where one channel (referred to herein as the traffic channel) is used to convey user data and the second channel (referred to herein as the probe channel) is used to facilitate acquisition and send network probe messages to distant users. In some embodiments, the two channels may share the same center frequency and be code division multiplexed with one another. The probe channel operates at a data rate appropriate for neighbor discovery while the data rate of the traffic channel is allowed to vary based on traffic flows and link management requirements.

Embodiments cause a local node to take feedback from one-hop neighboring nodes of the local node (in the form of messages identifying signal power, rate, and signal-to-noise ratio (SNR) that those neighboring nodes communicate with their neighbors, i.e., the two-hop neighbors of the local node) and estimate the maximum power increase that the local node can make such that the power change will limit adverse effects on a given neighbor's reception of its identified neighbor nodes to no more than some previously defined SNR degradation threshold value (e.g. 0.5 dB). Note that in some embodiments, the degradation threshold value may be different for different one-hop neighbors of the local node. In other embodiments, a single degradation threshold value may be used for all one-hop neighbors of the local node. Note that while in the illustrated example, the embodiments extend to two-hop neighbor nodes, in other embodiments that are able to provide additional distributed information, even additional hop nodes may be used when implementing the principles illustrated herein.

The power increase that the local node can make is some value greater than or equal to the degradation threshold value. For example, if the local node is already dominating the noise-plus-interference floor of a neighboring node, then the maximum power increase will be equal to (or at least approach) the threshold value. That is, it is possible for a local node to cause interference at the same value as any transmission power increases if the local node dominates the noise-plus-interference floor of a neighboring node. Thus, in worst case scenario, a 0.5 dB increase in transmit power may result in a 0.5 dB increase in interference. However, the less dominant a local node is to a neighbor node, the more the local node can increase transmission power before meeting or exceeding the degradation threshold value. In the more general case, where the local node is not dominating the noise-plus-interference floor, the maximum allowed power increase could be much greater than the degradation threshold.

After the maximum power increase is calculated, it is used to create a new maximum for the current power and rate (PAR) calculation for power.

PAR adaptation in a code division multiple access (CDMA) mobile ad-hoc network (MANET) requires special attention due to the impact that power changes could have on the sensitivity of a neighboring node's receiver. Sudden increases in power by one user node can cause another node to lose its link. Thus, embodiments are implemented to combat this loss of link.

Embodiments are configured to determine how much the local node can increase its power and only cause a modest, controlled increase in interference to the nodes communicating with their one-hop neighbors.

Referring now to FIG. 1, an example is illustrated. In the example illustrated in FIG. 1, node 102A is the local node, with one-hop neighbor nodes 104-1, 104-2, and 104-3. One-hop neighbor node 104-1 has additional neighbor nodes 102E3 and 102C that are one-hop neighbor nodes with respect to node 104-1, and two-hop neighbor nodes with respect to the local node 102A. Nodes 104-2 and 104-3 may also have additional one-hop neighbor nodes, but they are not shown for this illustrated example.

The following analysis is performed for each of the one-hop neighbor nodes in the local node's topology. The analysis examines the link connection information of the one-hop neighbors of the local node's one-hop neighbor that is being examined. In particular, in the example illustrated in FIG. 1, the one-hop neighbor node 104-1 sends to the local node 102A PAR information message 106 for its neighbors 102A, 102E3 and 102C respectively. Note that the PAR information message 106 is broadcast to all of the one-hop neighbors of 104-1, but it is shown between node 104-1 and node 102A because node 102A is consuming the message for the subject analysis. The PAR information message 106 describes the power, rate, and SNR at which payload data is received between the node 104-1 and its one-hop neighbors 102A, 102B, and 102C respectively. The PAR information message 106 may further include link connection information for the local node 102A itself, as well. That is, in the example illustrated, the PAR information message 106 may include PAR information measured by the node 104-1 for the local node 102A. The PAR between nodes is adjustable. Note that rates may be measured based on signals received from various nodes or self-reported by nodes identifying the PAR of signals sent by the nodes. From the information supplied in the PAR information message 106, the local node 102A can calculate how much additional power can be applied to produce a ΔdB change in the SNR of node 104-1's worst-case one-hop neighbor node (excluding the local node), which in some embodiments is measured as $E_b/N_0$, which is the energy per bit divided by noise power spectral density. As an example, A could be set to 0.5 dB.

In particular, local node 102A is the local node and has one-hop neighbor nodes 104-1, 104-2, and 104-3 in its desired topology (i.e., the topology that the local node is constructing and/or maintaining). A power step size calculation is run for each of the one-hop neighbor nodes 104-1, 104-2, and 104-3. FIG. 1 illustrates only an example for one-hop neighbor node 104-1 and its corresponding one-hop neighbors 102B and 102C, but it should be appreciated that similar operations are performed for nodes 104-2 and 104-3 with their one-hop neighbors (not shown, except for the local node 102A). Note that node 104-1 is connected to nodes 102A, 102B, and 102C. The calculation is independent of jamming or signals other than the worst-case desired node, where a desired node is a node that a local node is attempting to add to and/or maintain a topology. In the case depicted in FIG. 1, node 102C would likely be the worst-case node, since it is farther away from the node 104-1 than the other neighbors.

In the case of dual antennas (or other multiple antenna scenarios where signal to noise energy is reported or determined based on a transmitting antenna to receiving antenna basis), the worst-case node is found by taking the maximum reported SNR for each neighbor measured by the one-hop neighbor and then taking the minimum of that result. Thus, for example, in the case where there are two transmitting antennas and two receiving antennas per node, there will be four possible paths between nodes, and four corresponding SNR values. Thus, in a multiple antenna scenario, the maximum SNR for each node to node connection will be used to determine a minimum for all nodes under consideration.

The SNR may be expressed as $E_b/N_0$ which is the energy per bit divided by noise power spectral density. Alternatively, this may be expressed as $E_s/N_0$, which is the energy per symbol divided by noise power spectral density. Note that in some embodiments, a symbol may represent multiple bits such as for example where a quadrature phase shift symbol represents two bits.

Returning once again to FIG. 1, some embodiments may include a certain amount of approximation in a calculation. In some multiple antenna scenarios, a given PAR information message from a neighbor node does not report which receiving antenna is reporting the strongest path from a transmit antenna (e.g., the first of the second transmit antenna on an aircraft). However, the local node 102A will have one or more SNR values. Thus, in the two antenna scenarios, if there are two signal to noise ratio values (one for each antenna), then the calculation assumes that they were both received by the same receiving antenna, which would be the worst case. It can then be assumed that the strongest path of the worst-case node was also received on the same antenna. While this is not an unlikely case, it is the worst case, so it is accounted for.

The following derivation is shown for completeness. Note that the derivation is shown for a single local antenna that has overlapping traffic and beacon channels where a beacon channel is used for neighbor acquisition to add nodes to the network. Similar derivations can be used for multiple antennas, and a dual antenna equation is included below.

Definitions $[E_b/N_0]_{local,ant1}$: $E_b/N_0$ of the local node's antenna 1 transmit signal, measured by the one-hop neighbor $[E_b/N_0]_{local,ant2}$: $E_b/N_0$ of the local node's antenna 2 transmit signal, measured by the one-hop neighbor $[E_b/N_0]_{remote}$: $E_b/N_0$ of the remote (i.e. two-hop neighbor to the local node) node's strongest transmit signal, measured by the one-hop neighbor $PBO_{Tr,local}$: Power Backoff ratio for the local node's Traffic Channel $PBO_{Tr,remote}$: Power Backoff ratio for the remote node's Traffic Channel $P_{rcvd,local}$: Total Received Power from the local node
$P_{rcvd,remote}$: Total Received Power from the remote node
$P_T$: Total Power Received from all nodes of interest
$R_{Tr,local}$: Traffic Channel Rate for the local node
$R_{Tr,remote}$: Traffic Channel Rate for the remote node
$R_c$: Chip Rate
$N_0$: Noise Spectral Density, which also includes other interference sources as well $\Delta$: $E_b/N_0$ change allowed by calculation in linear units (e.g. $0.89125 = -0.5$ dB)
$\mu$: Power change value in linear units
Derivation:

$$[E_b/N_0]_i = \frac{PBO_{Tr,i} P_{rcvd,i}}{N_0 + \frac{P_T - PBO_{Tr,i} P_{rcvd,i}}{R_c}}$$

where, $P_T = \sum P_{rcvd,i}$ $$N_0 + \frac{P_T - PBO_{Tr,i} P_{rcvd,i}}{R_c} = \frac{PBO_{Tr,i} P_{rcvd,i}}{R_{Tr,i} [E_b/N_0]_i}$$

$$N_0 + \frac{P_T}{R_c} = \frac{PBO_{Tr,i} P_{rcvd,i}}{R_{Tr,i} [E_b/N_0]_i} + \frac{PBO_{Tr,i} P_{rcvd,i}}{R_c}$$

$$\frac{P_T + N_0 R_c}{R_c} = PBO_{Tr,i} P_{rcvd,i} \left( \frac{R_c + R_{Tr,i}[E_b/N_0]_i}{R_c R_{Tr,i}[E_b/N_0]_i} \right)$$

$$P_{rcvd,i} = \frac{(P_T + N_0 R_c) R_{Tr,i}[E_b/N_0]_i}{PBO_{Tr,i}(R_c + R_{Tr,i}[E_b/N_0]_i)}$$

$$P_{rcvd,i} = \frac{(P_T + N_0 R_c) R_{Tr,i}[E_b/N_0]_i}{PBO_{Tr,i}(R_c + R_{Tr,i}[E_b/N_0]_i)}$$

$$X_i = \frac{R_{Tr,i}}{PBO_{Tr,i}\left(\frac{R_c}{[E_b/N_0]_i} + R_{Tr,i}\right)} \text{ (This equation is of significance)}$$

$$P_{rcvd,i} = (P_T + N_0 R_c) X_i$$

-continued $$P_T = \sum (P_T + N_0 R_c) X_i$$

$$\sum X_i = X_{sum}$$

$$P_T = (P_T + N_0 R_c) X_{sum}$$

$$P_T - P_T X_{sum} = N_0 R_c X_{sum}$$

$$P_T (1 - X_{sum}) = N_0 R_c X_{sum}$$

$$P_T = N_0 R_c \frac{X_{sum}}{1 - X_{sum}}$$

$$P_{rcvd,i} = \left( N_0 R_c \frac{X_{sum}}{1 - X_{sum}} + N_0 R_c \right) X_i$$

$$P_{rcvd,i} = \left( \frac{X_{sum} + 1 - X_{sum}}{1 - X_{sum}} \right) N_0 R_c X_i$$

$$P_{rcvd,i} = \frac{N_0 R_c X_i}{1 - X_{sum}}$$

The power and rate of the remote node are constant, so the only thing affecting its $E_b/N_0$ is the noise-plus-interference floor. $\Delta$ is the old noise-plus-interference floor (smaller) divided by the new noise-plus-interference floor (larger).

$$\Delta = \frac{N_0 + \frac{P_T - PBO_{Tr,remote} P_{rcvd,remote}}{R_c}}{N_0 + \frac{P_T - (1-\mu) P_{rcvd,local} - PBO_{Tr,remote} P_{rcvd,remote}}{R_c}}$$

$$\Delta = \frac{N_0 R_c + P_T - PBO_{Tr,remote} P_{rcvd,remote}}{N_0 R_c + P_T - (1-\mu) P_{rcvd,local} - PBO_{Tr,remote} P_{rcvd,remote}}$$

$$\Delta = \frac{N_0 R_c + \frac{N_0 R_c X_{sum}}{1 - X_{sum}} - PBO_{Tr,remote} \frac{N_0 R_c X_{remote}}{1 - X_{sum}}}{N_0 R_c + \frac{N_0 R_c X_{sum}}{1 - X_{sum}} - (1-\mu) \frac{N_0 R_c X_{local}}{1 - X_{sum}} - PBO_{Tr,remote} \frac{N_0 R_c X_{remote}}{1 - X_{sum}}}$$

$$\Delta = \frac{1 + \frac{X_{sum}}{1 - X_{sum}} - PBO_{Tr,remote} \frac{X_{remote}}{1 - X_{sum}}}{1 + \frac{X_{sum}}{1 - X_{sum}} - (1-\mu) \frac{X_{local}}{1 - X_{sum}} - PBO_{Tr,remote} \frac{X_{remote}}{1 - X_{sum}}}$$

$$\Delta = \frac{1 - PBO_{Tr,remote} X_{remote}}{1 - (1-\mu) X_{local} - PBO_{Tr,remote} X_{remote}}$$

Solving for $\mu$, $$\mu = \frac{(1-\Delta) - (1-\Delta) PBO_{Tr,remote} X_{remote} + \Delta X_{local}}{\Delta X_{local}}$$

For two antennas, $$\mu = \frac{(1-\Delta) - (1-\Delta) PBO_{Tr,remote} X_{remote} + \Delta(X_{local,ant1} + X_{local,ant2})}{\Delta(X_{local,ant1} + X_{local,ant2})}$$

As mentioned above, the intent of this process is to run the calculation for each of the one-hop neighbors. At some point, an increase in the local node's power will cause a two-hop neighbor to fall below the power control $E_b/N_0$ target. In that case, the two-hop neighbor will need to increase its power, decrease its rate, or stop power controlling to the one-hop neighbor. Depending on the network objectives, the local node may decide to not increase its power in order to avoid the case where the two-hop neighbor would no longer be able to maintain the link. Note that the values needed to run the calculations on a given one-hop neighbor come from that node's most recent PAR information message.

Figure 2:
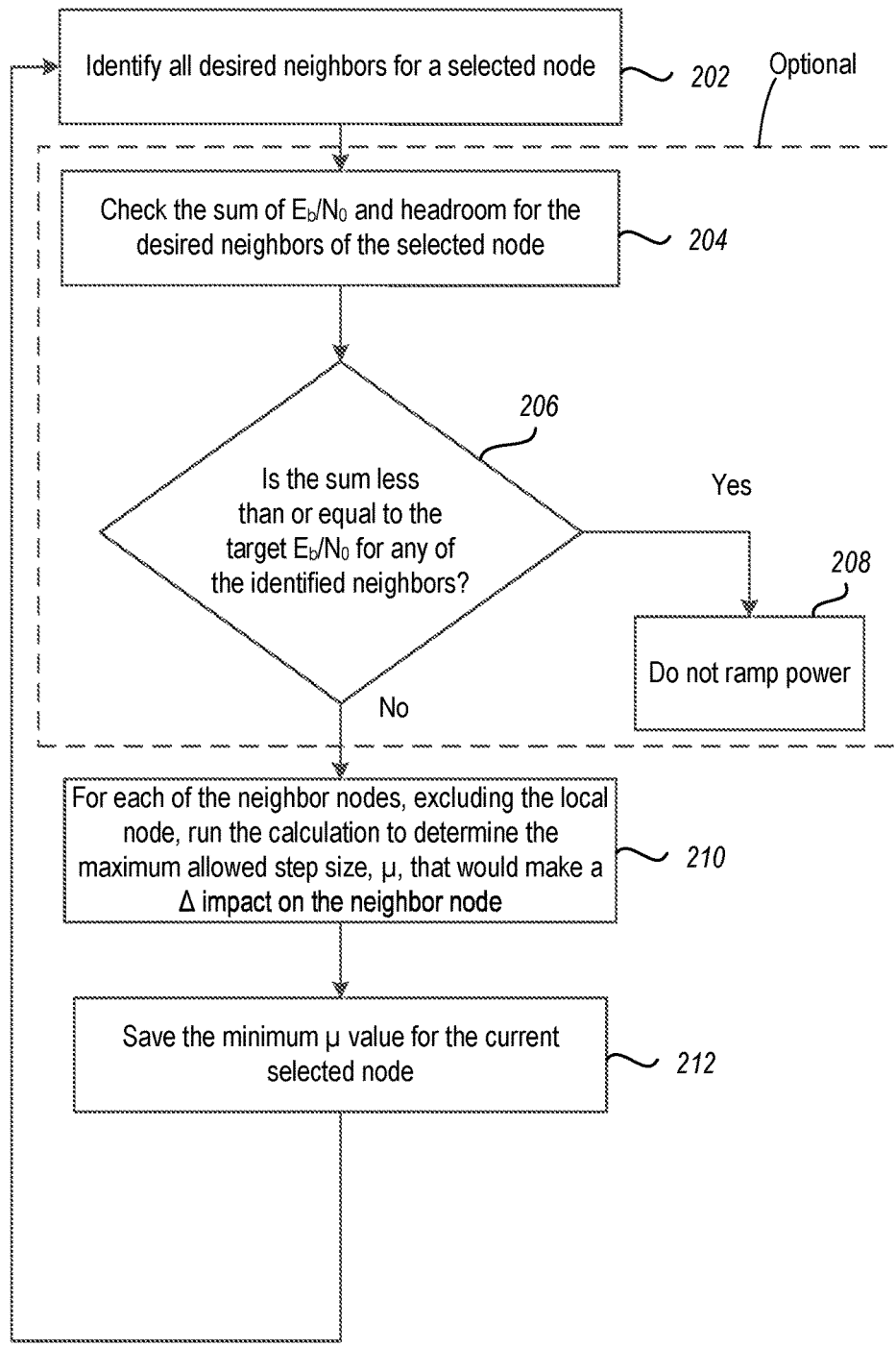
FIG. 2 illustrates a flow for determining a value that transmits power can be increased in the network for a local node.

Referring now to FIG. 2, an overall process 200 is illustrated. The following steps highlight the full algorithm where nodes 104-1, 104-2, and 104-3 are one-hop neighbors to node 102A (local node). In the example illustrated, the process 200 may be performed by the local node 102A. However, in other embodiments, various elements of the process 200 may be performed by various nodes and/or by a central processing system.

As illustrated at 202, embodiments identify all (although in some embodiments, the local node, may be excluded) desired neighbors for a selected one hop neighbor node of the local node. In this case, the selected node is node 104-1. The desired neighbor nodes of the selected one hop neighbor node 104-1 are nodes 102A, 102B, and 102C. In this context, the desired nodes are nodes that a local node is attempting to add to and/or maintain a topology.

The following now illustrates certain optional considerations that may be made with respect to headroom. Headroom is defined here as the ratio of the maximum potential rate that a node can communicate with its desired topology to the current rate. As illustrated at 204, embodiments then check the sum of $E_b/N_0$ and previously determined headroom for the desired neighbors (e.g., 102B, and 102C) of the selected node (e.g., node 104-1), excluding the $E_b/N_0$ and previously determined desired headroom for the local node (e.g., node 102A). The $E_b/N_0$ and the headroom are summed because both values are expressed in the log domain (e.g., dB).

As illustrated at 206, a determination is made as if the sum of $E_b/N_0$ and headroom for any of the identified neighbors is less than or equal to the target $E_b/N_0$. As illustrated at 208, if the sum is less than or equal to the target $E_b/N_0$, the transmit power should not be increased by the local node (e.g., node 102A) and the process 200 is exited. Note that the process may be restarted at a later time, such as a periodic or random future time, due to measurements of noise in an environment reaching a predetermined threshold, due to nodes having traveled some predetermined distance, or for other reasons. For example, the process may be restarted as part of the next power and rate control interval, which is the preferred approach.

Note that acts 204-208 are shown as being optional. Indeed, in some embodiments, there may be a need to continue ramping even if it causes a node to lose a link. If the local node has higher priority traffic, then it may be desirable to keep ramping even if it causes another node to drop the link.

As illustrated at 210, if the sum is less than or equal to the target $E_b/N_0$, for each of the neighbor nodes (e.g., nodes 102B, and 102C) of the one-hop neighbor under investigation (e.g., 104-1), excluding the local node (e.g., node 102A), embodiments run the calculation to determine the maximum allowed step size, μ, that would make a $\Delta_{dB}$ impact on the selected neighbor node's $E_b/N_0$ (e.g., node 104-1). Note that while the equations illustrated herein are expressed in linear terms, additional computations can be performed to express computed impairment of the $E_b/N_0$ in dB values.

As illustrated at 212, embodiments may then save the minimum μ value for the current selected one-hop neighbor (e.g. node 104-1).

As shown, the acts are repeated for all one-hop neighbors (e.g., nodes 104-2 and 104-3, although as noted above, no neighbor nodes are shown for the other one-hop neighbor nodes, except the local node 102A) and embodiments use the overall minimum μ value from all of the one-hop neighbors (e.g., nodes 104-1, 104-2, and 104-3).

The transmit power at the local node (e.g., node 102A) can then be increased by a factor that is less than or equal to the minimum μ value. In other words, the minimum μ value defines the maximum permissible power step size.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Referring now to FIG. 3, a method 300 is illustrated. The method 300 may be practiced in an ad-hoc mesh network. The method 300 includes acts for increasing power transmitted by a local node.

The method 300 includes identifying one-hop neighbor nodes of the local node in the mesh network (act 302). Thus, for example, in FIG. 1, the local node 102A may identify its one hop neighbors, 104-1, 104-2, and 104-3.

The method 300 further includes identifying one or more threshold maximum changes in interference caused by the local node increasing its transmit power for each of the one-hop neighbor nodes of the local node (act 304). For example, as described previously, various determinations can be made for each of nodes 104-1, 104-2, and 104-3 as to a threshold maximum change in interference. Note that the threshold maximum could be determined to be the same for all neighbor nodes, or could be different for different neighbor nodes. In some embodiments, the threshold maximum for some nodes could be infinity. That is, for some nodes the threshold may be irrelevant, and thus allowed to be infinite.

The method 300 further includes identifying a plurality of power change values, each power change value in the plurality of power change values corresponding to a power change at the local node that would cause one of the threshold maximum changes in interference to occur at a corresponding one-hop neighbor node of the local node (act 306).

The method 300 further includes identifying a lowest power change value from among the plurality of power change values (act 308).

As a result, the method 300 further includes increasing power transmitted by the local node, while limiting an increase in power transmitted by the local node to no more than the lowest power change value. Thus, the transmit power of the local node 102A could be increased by no more than the lowest power change value identified.

The method 300 may be practiced where the one or more threshold maximum changes in interference caused by the local node increasing its transmit power for each of the one-hop neighbor nodes of the local node comprises a single threshold maximum change applicable to all one-hop neighbor nodes of the local node.

The method 300 may be practiced where the one or more threshold maximum changes in interference caused by the local node increasing its transmit power for each of the one-hop neighbor nodes of the local node are determined based on priority of the neighbor nodes of the local node. For example, certain nodes performing mission critical functions, or nodes being used by preferred users, etc. may have lower thresholds than other nodes.

The method 300 may be practiced where identifying a plurality of power change values comprises the local node receiving the power change values as computed by the neighbor nodes of the local node by each of the neighbor nodes of the local node using signal power and rate information for a given neighbor node of the local node and one-hop neighbor nodes of the given neighbor node. Thus, for example, the local node 102A may receive power change values as a result of nodes 104-1, 104-2, and 104-3 computing and providing the power change values based on PAR information received in PAR information messages from their one-hop neighbor nodes (e.g., nodes 102B and 102C for node 104-1).

The method 300 may be practiced where identifying a plurality of power change values comprises the local node computing the power change values using signal power and rate information for each of the neighbor nodes of the local node and one-hop neighbor nodes of each of the neighbor nodes, the signal power and rate information being provided by each of the neighbor nodes of the local node. Thus for example, nodes 104-1, 104-2, and 104-3 may provide PAR information in PAR information messages (e.g., PAR information message 106) from their one hop neighbors (e.g., in the case of 104-1, nodes 102B and 102C) to local node 102A which may then use that information to compute the power change values locally at the local node 102A.

The method 300 may be practiced where the acts are performed as part of a startup operation of the mesh network. For example, the acts may be performed in an iterative fashion when starting a mesh network so as to step up to a final transmit power over several iterations. That is, the method 300 may be performed several times, iteratively, to gradually step up transmit power.

The method 300 may be practiced where identifying one or more threshold maximum changes in interference comprises computing a combination of a signal to noise ratio and a headroom value. For example, embodiments may compute a product of a signal to noise ratio and a headroom value, which is equivalent to computing a sum of a signal to noise ratio and a headroom value in the log domain.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a mesh network, a method of increasing power transmitted by a local node, the method comprising:
   identifying one-hop neighbor nodes of the local node in the mesh network;
   identifying one or more threshold maximum changes in interference caused by the local node increasing its transmit power for each of the one-hop neighbor nodes of the local node;
   identifying a plurality of power change values, each power change value in the plurality of power change values corresponding to a power change at the local node that would cause one of the threshold maximum changes in interference to occur at a corresponding one-hop neighbor node of the local node;
   identifying a lowest power change value from among the plurality of power change values; and
   as a result, increasing power transmitted by the local node, while limiting an increase in power transmitted by the local node to no more than the lowest power change value.

2. The method of claim 1, wherein the one or more threshold maximum changes in interference caused by the local node increasing its transmit power for each of the one-hop neighbor nodes of the local node comprises a single threshold maximum change applicable to all one-hop neighbor nodes of the local node.

3. The method of claim 1, wherein the one or more threshold maximum changes in interference caused by the local node increasing its transmit power for each of the one-hop neighbor nodes of the local node are determined based on priority of the neighbor nodes of the local node.

4. The method of claim 1, wherein identifying a plurality of power change values comprises the local node receiving the power change values as computed by the neighbor nodes of the local node by each of the neighbor nodes of the local node using signal power and rate information for a given neighbor node of the local node and one-hop neighbor nodes of the given neighbor node.

5. The method of claim 1, wherein identifying a plurality of power change values comprises the local node computing the power change values using signal power and rate information for each of the neighbor nodes of the local node and one-hop neighbor nodes of each of the neighbor nodes, the signal power and rate information being provided by each of the neighbor nodes of the local node.

6. The method of claim 1, wherein the acts of claim 1 are performed as part of a startup operation of the mesh network.

7. The method of claim 1, wherein identifying one or more threshold maximum changes in interference comprises computing a combination of a signal to noise ratio and a headroom value.

8. A computer system comprising:
   one or more processors; and
   one or more non-transitory computer-readable media having stored thereon instructions that are executable by the one or more processors to configure the computer system to increase power transmitted by a local node, including instructions that are executable to configure the computer system to perform at least the following:
   identify one-hop neighbor nodes of the local node in a mesh network;
   identify one or more threshold maximum changes in interference caused by the local node increasing its transmit power for each of the one-hop neighbor nodes of the local node;
   identify a plurality of power change values, each power change value in the plurality of power change values corresponding to a power change at the local node that would cause one of the threshold maximum changes in interference to occur at a corresponding one-hop neighbor node of the local node;
   identify a lowest power change value from among the plurality of power change values; and
   as a result, increase power transmitted by the local node, while limiting an increase in power transmitted by the local node to no more than the lowest power change value.

9. The computer system of claim 8, wherein the one or more threshold maximum changes in interference caused by the local node increasing its transmit power for each of the one-hop neighbor nodes of the local node comprises a single threshold maximum change applicable to all one-hop neighbor nodes of the local node.

10. The computer system of claim 8, wherein the one or more threshold maximum changes in interference caused by the local node increasing its transmit power for each of the one-hop neighbor nodes of the local node are determined based on priority of the neighbor nodes of the local node.

11. The computer system of claim 8, wherein identifying a plurality of power change values comprises the local node receiving the power change values as computed by the neighbor nodes of the local node by each of the neighbor nodes of the local node using signal power and rate information for a given neighbor node of the local node and one-hop neighbor nodes of the given neighbor node.

12. The computer system of claim 8, wherein identifying a plurality of power change values comprises the local node computing the power change values using signal power and rate information for each of the neighbor nodes of the local node and one-hop neighbor nodes of each of the neighbor nodes, the signal power and rate information being provided by each of the neighbor nodes of the local node.

13. The computer system of claim 8, wherein the acts of claim 8 are performed as part of a startup operation of the mesh network.

14. The computer system of claim 8, wherein identifying one or more threshold maximum changes in interference comprises computing a combination of a signal to noise ratio and a headroom value.

15. A non-transitory computer system readable storage medium comprising having stored thereon instructions that are executable by one or more processors to configure a computer system to increase power transmitted by a local node, including instructions that are executable to configure the computer system to perform at least the following:
   identify one-hop neighbor nodes of the local node in a mesh network;

identify one or more threshold maximum changes in interference caused by the local node increasing its transmit power for each of the one-hop neighbor nodes of the local node;

identify a plurality of power change values, each power change value in the plurality of power change values corresponding to a power change at the local node that would cause one of the threshold maximum changes in interference to occur at a corresponding one-hop neighbor node of the local node;

identify a lowest power change value from among the plurality of power change values; and as a result, increase power transmitted by the local node, while limiting an increase in power transmitted by the local node to no more than the lowest power change value.

16. The non-transitory computer system readable storage medium of claim 15, wherein the one or more threshold maximum changes in interference caused by the local node increasing its transmit power for each of the one-hop neighbor nodes of the local node comprises a single threshold maximum change applicable to all one-hop neighbor nodes of the local node.

17. The non-transitory computer system readable storage medium of claim 15, wherein the one or more threshold maximum changes in interference caused by the local node increasing its transmit power for each of the one-hop neighbor nodes of the local node are determined based on priority of the neighbor nodes of the local node.

18. The non-transitory computer system readable storage medium of claim 15, wherein identifying a plurality of power change values comprises the local node receiving the power change values as computed by the neighbor nodes of the local node by each of the neighbor nodes of the local node using signal power and rate information for a given neighbor node of the local node and one-hop neighbor nodes of the given neighbor node.

19. The non-transitory computer system readable storage medium of claim 15, wherein identifying a plurality of power change values comprises the local node computing the power change values using signal power and rate information for each of the neighbor nodes of the local node and one-hop neighbor nodes of each of the neighbor nodes, the signal power and rate information being provided by each of the neighbor nodes of the local node.

20. The non-transitory computer system readable storage medium of claim 15, wherein identifying one or more threshold maximum changes in interference comprises computing a combination of a signal to noise ratio and a headroom value.

* * * * *